DATA PROCESSING SYSTEM

Filed June 12, 1961 3 Sheets-Sheet 1

INVENTORS
LASZLO L. RAKOCZI & WILLIAM J. GESEK
BY Samuel Cohen
Attorney

INVENTORS
LASZLO L. RAKOCZI &
WILLIAM J. GESEK
BY Samuel [signature]
Attorney

INVENTORS
LASZLO L. RAKOCZI &
WILLIAM J. GESEK
BY [signature]
Attorney

3,251,038
DATA PROCESSING SYSTEM

Laszlo L. Rakoczi, Merchantville, and William J. Gesek, Linden, N.J., assignors to Radio Corporation of America, a corporation of Delaware
Filed June 12, 1961, Ser. No. 116,592
6 Claims. (Cl. 340—172.5)

The present invention relates to the control of a data processing system such as a digital computer. More particularly, the invention relates to an improved circuit in a digital data processing system for communicating between a register which stores a word indicative of an operation to be performed by the system and stages of the system which are to perform the operation.

*Brief description of invention*

The circuit of the invention communicates between an *n* stage register, which stores a word indicative of an operation to be performed, and the stages which perform the operation. Each stage in the register stores a binary bit so that the register is capable of storing any one of $2^n$ different words. A bus, the conductors of which receive the bits, applies the bits to an encoder located at or near the register. The encoder translates the word on the bus to *k* words, each having a number of bits, one bit of each word representing one binary digit and all other bits of each word the other binary digit, where *k* is an integer substantially smaller than *n*. There are *k* buses connected to the encoder, each bus having a number of conductors and each bus carrying one of the *k* words. The total number of conductors in the *k* buses is substantially smaller than $2^n$. This arrangement has a number of important advantages which are given later in connection with the detailed discussion of the invention.

*Brief description of drawings*

Similar reference numerals are applied to similar components throughout the figures.

*General*

Figure 1:
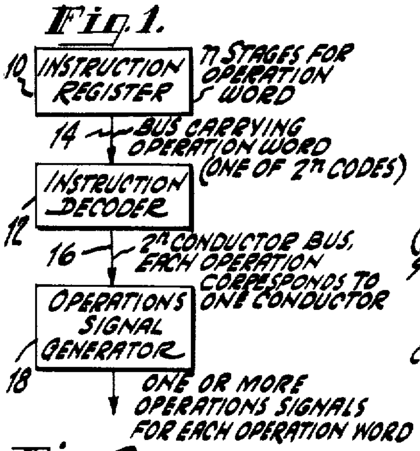
FIG. 1 is a block circuit diagram of prior art control circuits of a computer.

A number of blocks shown in the figures represent known circuits. The circuits of the blocks are actuated by electrical signals applied to the blocks. When a signal is at one level, it represents the binary digit "one" and when it is at another level, such as zero volts, it represents the binary digit "zero." For the sake of the discussion which follows, it may be assumed that a high level signal represents the binary digit "one" and a low level signal the binary digit "zero." Also, to simplify the discussion, rather than speaking of an electrical signal being applied to a block or logic stage, it is sometimes stated that a "one" or a "zero" is applied to a block or logic stage.

Throughout the figures capital letters, small letters, and Greek letters are used to represent signals indicative of binary digits. For example, A may represent the binary digit "zero" or the binary digit "one." $\bar{A}$ represents the complement of A. In some cases letters are employed in Boolean equations as a convenient means for describing the circuit operation.

A number of elementary logic circuits are present in various ones of the figures. An "and" gate produces a "one" output when all of the inputs are "one" and a "zero" output when one or more of the inputs are "zero." It is represented by a block with A in it. A "none" gate, sometimes also known as a "nor" gate, produces a "one" output when all of the inputs to the gate are "zero" and a "zero" output when one or more of the inputs are "one." A "none" gate is represented by a block with an N in it. This gate may consist of an "and" gate which has an inverter in series with each of its input leads. Alternatively, it may consist of an "or" gate followed by an inverter. Regardless of the way in which the "none" gate is implemented, its Boolean equation in the case in which there are inputs A and B and one output C is as follows: $\bar{A}\bar{B}=C$ or $\overline{A+B}=C$.

An instruction consists of a number of binary bits which indicates a desired computer operation, how it is to be performed, the addresses in the memory of the data words on which the operation is to be performed, and so on. The instruction may initially be stored in a memory and, upon command, transmitted from the memory to an instruction register. In the present discussion, only the portion of the instruction dealing with the "operation" to be performed is of interest. This portion is termed here an "operation word." It includes nine bits which indicate a register which is to receive a data word and nine bits which indicate a register which is to transmit a data word. These two nine bit words may each be coded in $2^9$ or 512 different ways which means that any one of 512 different registers can be selected to receive a data word, and any one of 512 different registers independently can be selected to transmit a data word.

The convention is adopted that when a flip-flop in a register is set, its barred output terminal produces a "one" output and its unbarred output terminal a "zero" output. The converse holds when a flip-flop is reset.

The present invention is useful in the many places in a digital data processing system where it is desired to transmit command or control signals to various stages in the system which are to perform certain operations. However, the invention is illustrated here by the operation of transferring a data word stored in one register to another register. In this operation the receiving register is first reset. Then the output gates of the transmitting register are enabled and the input gates of the receiving register are enabled. The transmitting register applies the word it stores to a data bus through its output gates and the receiving register thereupon receives the word on the data bus through its input gates.

*Control circuits of prior art computers*

Typical control circuits for computers are discussed in chapter 17 of the volume, Digital Computer and Control Engineering by R. S. Ledley. The circuit of FIG. 1 is like one of those shown by Ledley. The purpose of discussing this circuit is to orient the reader with respect to the control circuits of FIG. 2 so that the reader may better understand where in a computer the present invention may be employed.

The instruction register 10 of FIG. 1 receives from the memory an instruction word. The portion of the word of interest here is known as the operation portion and may be either a part of the instruction word or, in some computers, an entire instruction word. As already mentioned, the operation portion of the word is termed here an "operation word." If the operation word is made up of *n* binary bits, the instruction register must include *n* flip-flops, one for storing each binary bit.

The instruction decoder 12 is connected to the instruction register 10 by means of bus 14. The bus 14 may include *n* conductors, however, in the system of the present invention, it includes 2*n* conductors, *n* conductors for carrying a word, and *n* for carrying the complement of the word, as described later.

The function of the instruction decoder is to produce a unique signal for the particular operation word stored in the register 10. If there are $2^n$ different operation words which are possible, then the instruction decoder can produce any one of $2^n$ different output signals. The bus 16 at the output of the instruction decoder may contain $2^n$ conductors, one for each of the signals the decoder is capable of producing.

The output of the instruction decoder is applied to an operations signal generator 18. It produces one or more operations signals for each operation word. These operations signals usually are applied directly to the stages which actually perform the operation directed by the operation word.

*Control circuits of the computer of which the invention is a part*

Figure 2:
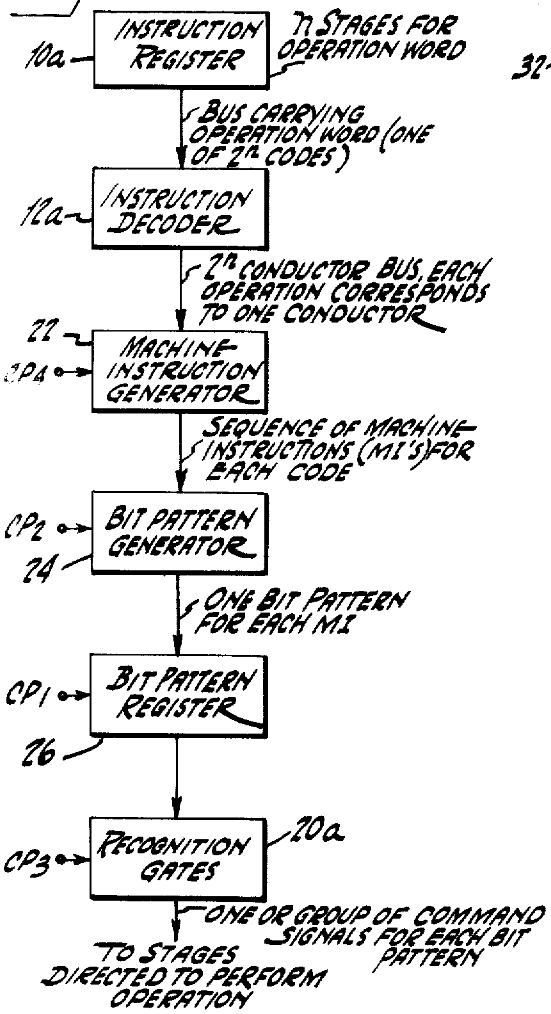
FIG. 2 is a generalized block diagram of control circuits in a particular computer of which the present invention is a part.

The circuit of FIG. 2 includes an instruction register **10*a* and an instruction decoder 12*a*. These two circuits are analogous to the corresponding circuits of FIG. 1. The instruction decoder applies its output to a machine instruction generator 22. The machine instruction generator generates a sequence of machine instructions (MI's) for each code stored in the instruction register. The succeeding machine instructions are applied to a bit pattern generator 24. In general, the generator 24 produces a different bit pattern for each machine instruction signal it receives. It is possible for the same bit pattern to be generated more than once in response to a group of machine instructions, under certain conditions, however, this is not of importance in the present invention. The bit pattern generated at 24 is stored in the bit pattern register 26. The bit pattern register applies its output to recognition gates 20*a***.

It is evident from FIGS. 1 and 2 that the operations signal generator of FIG. 1 is replaced in the machine (computer) under discussion by the three stages 22; 24 and 26. While not directly involved in the present invention, it might be mentioned here that the additional stages of FIG. 2 enable the digital computer under discussion to generate many more combinations of command signals than the circuit of FIG. 1. (The command signals are analogous to the operations signals of FIG. 1.)

In the operation of the circuits of FIG. 2, a pulse CP1 from a control pulse generator (not shown) is first applied to the bit pattern register 26. It clears, that is, resets the register. The following pulse CP2 opens the output gates of the bit pattern generator 24 and the bit pattern produced by the generator 24 thereupon passes into the bit pattern register 26. The next pulse CP3 enables the recognition gates **20*a* so that they produce the command signal or signals corresponding to the bit pattern stored in the bit pattern register 26. The next pulse CP4 is applied to the machine instruction generator 22. It functions to advance the machine instruction generator 22** to the next machine instruction. Thereafter, the cycle CP1–CP4 is repeated.

The circuit operation discussed immediately above is not directly a part of the present invention. However, details of the generator which produces CP1–CP4 may be found in FIG. 17 of application Serial No. 62,644, Data Processing System, filed October 14, 1960 by Eli Gloates et al. and assigned to the same assignee as the present invention. The return W of FIG. 17 supra corresponds to the completion of an operation as, for example, the completion of the transfer of information from one data register to a second data register.

The bit pattern generator 24 may correspond to stages 206–210 of FIG. 12 of the copending application above. The machine instruction generator 22 is shown schematically in FIG. 12 of the above-identified application by block 200. Typical bit pattern register and recognition gates of FIG. 2 are discussed later. These may also correspond to the register 201–205 of FIG. 12 and the gates 211–218 of FIG. 12 of the above copending application.

*Discussion of problem dealt with in the present application*

The problem dealt with in the present application is that of communication between the bit pattern register 26 and the stages to perform the operation called for by the bit pattern stored in the register 26. A more detailed showing of the bit pattern register appears in FIG. 3. It is assumed for the sake of this discussion that the register 26 includes nine flip-flops for controlling the read-out of signals from 512 different registers and nine flip-flops for controlling the read-in of signals to these 512 registers. The read-out flip-flops are shown by sub-block **26*a* and the read-in flip-flops are shown by sub-block 26*b*. There are $2^9$ recognition gates 28 connected to the read-out flip-flops 26*a* and $2^9$ recognition gates 30 connected to the read-in flip-flops 26*b***.

In the computer under discussion, rather than employing a nine wire bus for the read-out word and a similar bus for the read-in word, 18 wires are employed in each of the buses 36 and 38. Nine of the wires connect to one output terminal of each flip-flop, respectively, and nine connect to the other output terminal of each flip-flop, respectively. Thus, nine wires carry the operation word stored in the nine flip-flops and the nine other wires carry the complement of the operation word stored in the flip-flops. One advantage of employing the word bus and the complement bus is that it enables one easily to determine when a bit is missing. There are other advantages but these need not be discussed here.

Figure 4:
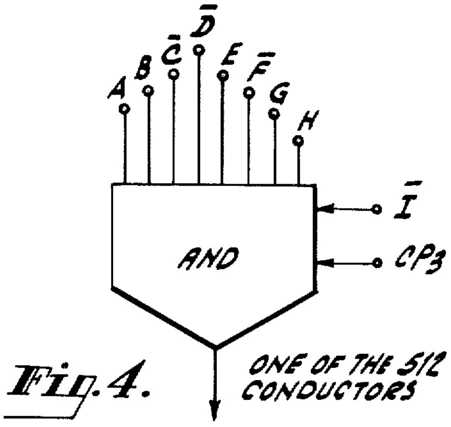
FIG. 4 is a circuit diagram of a typical recognition gate in the circuit of FIG. 3.

Each of the recognition gates **20*a* receives nine inputs from the bit pattern register and one input CP3 for enabling the recognition gates. A typical recognition gate is shown in FIG. 4. It is an "and" gate although it could as easily be a "none" gate. The capital letters represent one output of the A flip-flop. B** represents the corresponding output of the B flip-flop. $\overline{C}$ represents the opposite (complement) output of the C flip-flop and so on.

The "and" gate shown in FIG. 4 is actuated only when all of its inputs represent the binary digit "one." Further, each of the 1024 "and" gates represented by block **20*a* receives a different input code. Thus, the read-out flip-flops 26*a* can select one of the $2^9$ (512) gates 28 and the read-in flip-flops 26*b* can select one of the 512 gates 30**.

The commands on buses 32 and 34 must be applied to the stages directed to perform a desired computer operation. For example, bus 32 is connected to various read-out gates, that is, gates at the output of the various registers, and bus 34 is connected to gates at the inputs of the various registers. If the recognition gates 20 are located close to the bit pattern register 26, the buses 32 and 34 will have to be relatively long. For example, these buses may be 30 feet or more in length and will have to be threaded through the computer to the various registers. It is difficult to thread a bus so long which is made up of so many wires through a computer. Another disadvantage of this type of arrangement is there must be built into the computer a sufficient number of recognition gates 28, 30 to permit future expansion of the machine. Thus, the price of the computer is higher than it needs to be for the user who intends not to expand the machine. On the other hand, if only the number of recognition gates required by the basic computer were originally built into the computer, the computer could not be expanded without major modification.

One possible solution to the problem above is to distribute the recognition gates **20*a* among the stages which are to be controlled by the recognition gates. In this event the 1024 conductors of buses 32 and 34 can be quite short since each gate is located immediately adjacent to the stage controlled by the gate. The two 18 wire buses 36, 38 may be up to 30 feet or more long, but 36 wires is not an excessive number of wires to thread through the computer. However, this arrangement also involves difficulties. Each wire of each bus is connected to 256 different gates. When the buses 36 and 38** are short, it is possible to drive this many gates. However, when the buses are 30 feet or so long, the additional lengths of wire plus the gates load the bit pattern register excessively and it is found that the losses during the transmission are so great that it is difficult, if not impossible, to drive the distributed recognition gates. Further, nine wires of each bus represent the binary digit "one" and nine, the binary digit "zero." Assume that one value of binary digit is represented by a high voltage. In this case, the nine wires carrying this digit, when they go high, induce voltages in the nine wires carrying the other digit. These induced voltages, known as cross talk, are found to cause extraneous triggering of the recognition gates.

*Present invention*

Figure 5:
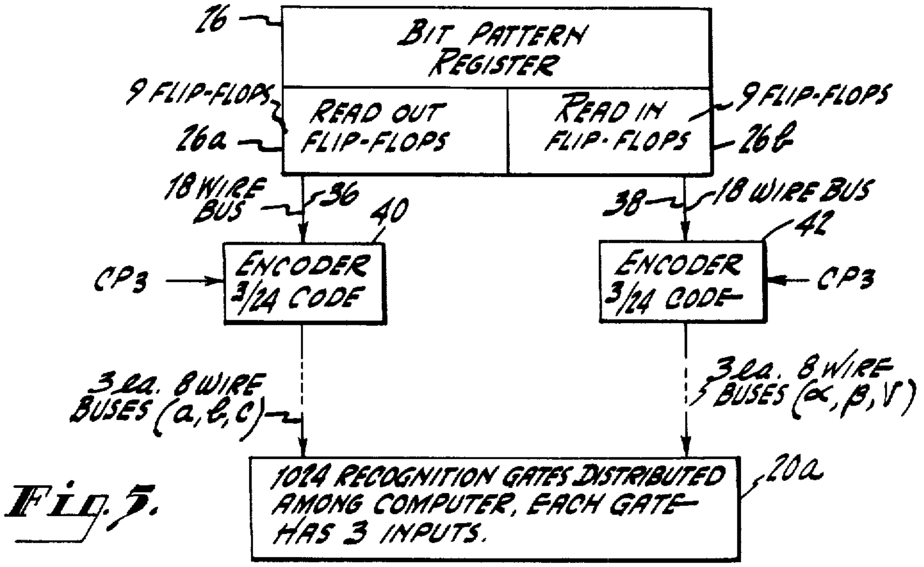
FIG. 5 is a block diagram of one form of the present invention.

The system of the present invention is shown in FIG. 5. The bit pattern register 26 is the same as the one of FIG. 2. The two 18 wire buses 36 and 38 are also the same as the buses in FIG. 2. However, now these buses lead to two additional stages, namely encoders 40 and 42, respectively. The encoders 40 and 42 are located immediately adjacent to the bit pattern register 26 so that buses 36 and 38 are short. The purpose of the encoder 40 is to convert each nine bit operations word stored in **26*a* to three eight bit words. Similarly, the purpose of encoder 42 is to convert each nine bit operations word stored in 26*b*** to three eight bit words. One bit of each of the eight bit words represents the binary digit "one" and all other bits, the binary digit "zero." Alternatively, one bit could represent a "zero" and all other bits a "one" if the recognition gates are "none" gates rather than "and" gates. Thus, three eight wire buses such as *a*, *b*, *c* are capable of representing $8 \times 8 \times 8 = 512$ different combinations. In a similar manner, the three eight wire buses $\alpha$, $\beta$, $\gamma$ are also capable of representing 512 different combinations.

Figure 6:
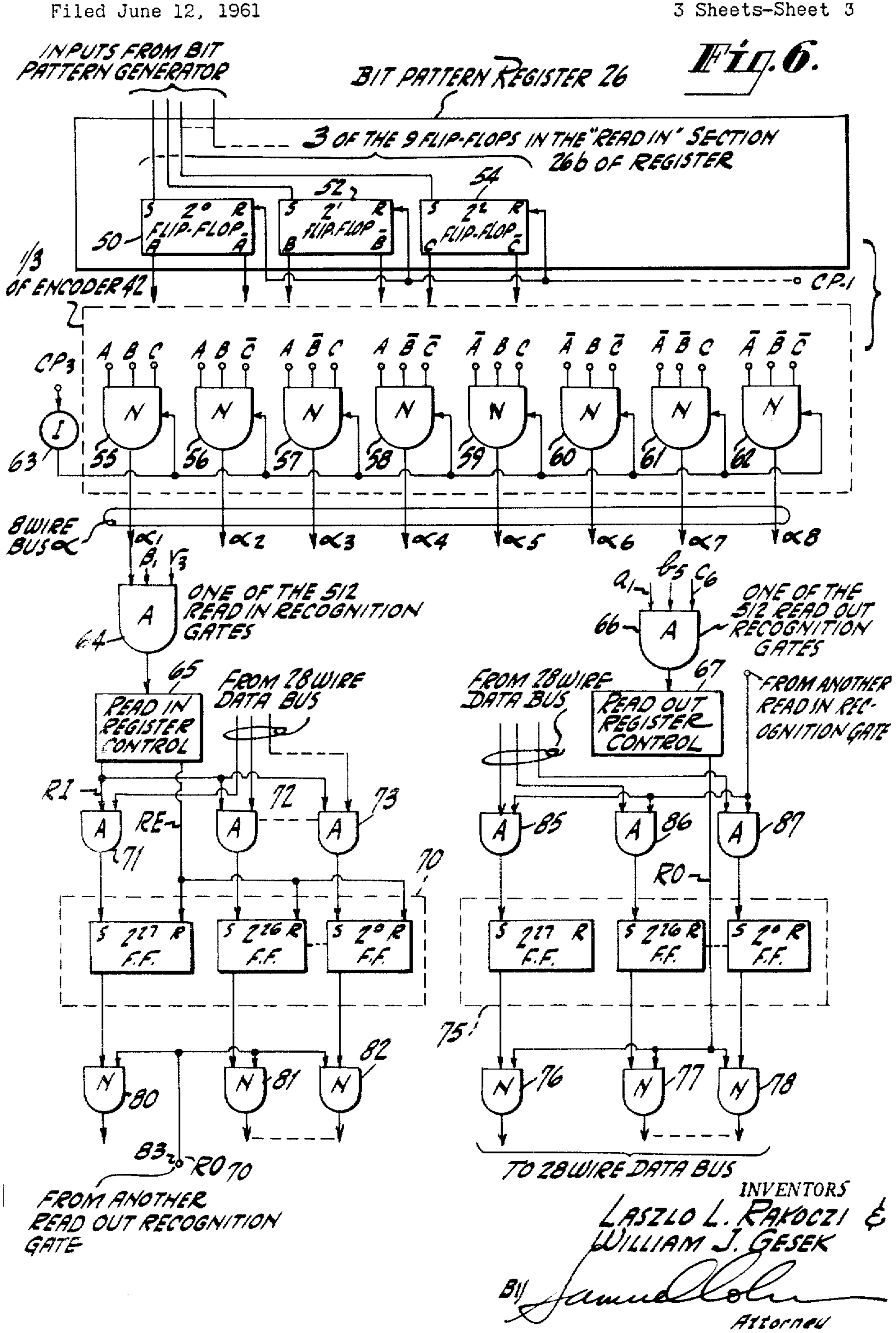
FIG. 6 is a more detailed showing of the present invention and includes also registers controlled by the control circuits of the invention.

The 1024 recognition gates **20*a*** are distributed among the register circuits to be controlled. Each recognition gate receives only three inputs, one conductor from each of the three buses $\alpha$, $\beta$, $\gamma$ or one conductor from each of the three buses *a*, *b*, *c*. The recognition gates may be "and" gates as illustrated in FIG. 6 or "none" gates. A three input "and" gate is much simpler and cheaper than a 10 input "and" gate. For example, in the case in which the gate is implemented with diodes, a 10 input "and" gate requires 10 diodes, one in series with each input, whereas a three input "and" gate requires only three diodes. The same considerations apply when the recognition gates are "none" gates. Three input "none" gates are much simpler and cheaper than 10 input "none" gates.

Some important advantages of the circuit of FIG. 5 are:

(1) Only 24 conductors are required to transmit 512 different codes. This is substantially fewer than (less than $1/_{20}$) the number of conductors required for buses 32 and 34 of FIG. 3.

(2) The encoders 40 and 42 are located immediately adjacent to the bit pattern register so that the buses 36 and 38 are of short length and do not load excessively the bit pattern register.

(3) Each of the conductors in each eight wire bus is connected only to 64 different recognition gates. In this respect, the load on each stage in the encoder is much less than the load on each stage of the register of the arrangement of FIG. 3. In the latter, each wire is connected to 256 different gates and, when the buses 36 and 38 are made long, the loading is such that the bit pattern register cannot reliably drive the recognition gates.

(4) The system of FIG. 5 requires additional stages, namely encoders 40 and 42. However, the cost of these stages is somewhat off-set in that the recognition gates **20*a* each require only three inputs whereas the comparable recognition gates 20*a*** of FIG. 3 each require 10 inputs. There can be a saving in the circuit of FIG. 3 of seven diodes per recognition gate.

Figure 3:
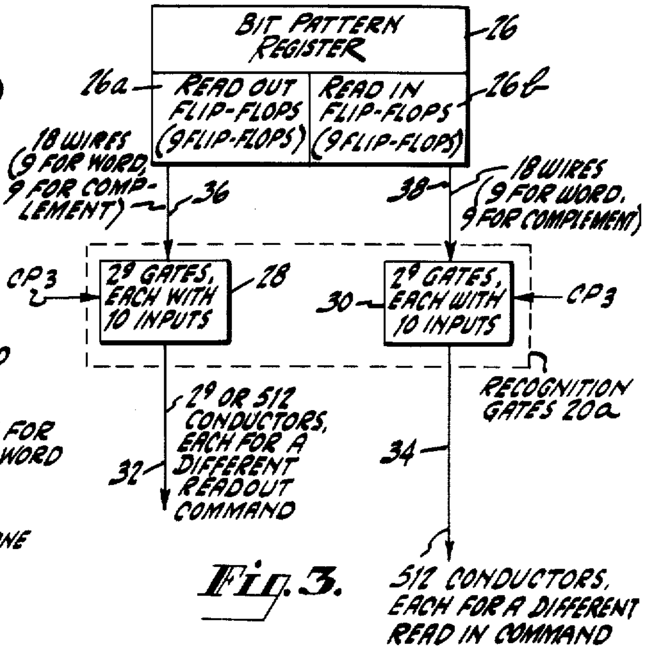
FIG. 3 is a block circuit diagram illustrating certain aspects of FIG. 2 in greater detail.

(5) There is considerably less cross-talk among the eight wire buses of the circuit of FIG. 5 than among the long 18 wire buses 36, 38 of the arrangement of FIG. 3. In the circuit of FIG. 5, only three wires go high at a time (a high is arbitrarily assumed to correspond to a binary "one") as contrasted to the nine wires which go high at a time in the circuit of FIG. 3. Accordingly (in the case in which buses 36 and 38 are the same lengths as buses *a*, *b*, *c* and $\alpha$, $\beta$, $\gamma$), there is less induced voltage among the remaining wires in the circuit of FIG. 5 than in the circuit of FIG. 3. Further, each eight wire bus of the circuit of FIG. 5 may be shielded from or spaced from the other eight wire buses to reduce the cross-talk even more.

(6) The computer can easily be expanded. Each piece of peripheral equipment which is added includes its own recognition gates and these need not be built into the basic computer.

*Bit pattern register*

The bit pattern register 26 includes nine flip-flops in the read-out section and nine flip-flops in the read-in section. For the purposes of the present explanation, only three flip-flops in the read-in section **26*b* are shown in FIG. 6. These are legended 50, 52, and 54**.

The set terminal of each flip-flop receives an input from the bit pattern generator (block 24 in FIG. 2). The reset terminal of each flip-flop receives the reset pulse CP1. In operation, all flip-flops in the read-in and read-out section of the register 26 are initially reset. Thereafter, the pattern of bits is applied to the set terminals of the flip-flops and the flip-flops store this bit pattern. It should be recalled here that when one of these flip-flops is set, a "one" is produced at the barred output terminal and a "zero" at the unbarred output terminal.

*Encoder 42*

The complete encoder 42 consists of 24 "none" gates, one for each conductor of the three eight conductor buses $\alpha$, $\beta$, $\gamma$. The first eight "none" gates, that is, the "none" gates for the $\alpha$ bus receive inputs from the first three flip-flops, namely the A(50), B(52) and C(54) flip flops. The next eight "none" gates receive inputs from the D, E and F flip-flops (not shown) and the final eight "none" gates receive inputs from the G, H and I flip-flops (not shown). Since each third of the encoder is substantially identical except for its inputs, only one-third of the encoder is illustrated in FIG. 6. This third of the encoder includes "none" gates 55–62 inclusive. The inputs to the various "none" gates are listed in the table below. To obtain the inputs to the next group of eight "none" gates, the bits D, E and F should be substituted for A, B and C, respectively, and so on.

| "None gate": | Inputs |
|---|---|
| **55** | A B C |
| **56** | A B $\bar{C}$ |
| **57** | A $\bar{B}$ C |
| **58** | A $\bar{B}$ $\bar{C}$ |
| **59** | $\bar{A}$ B C |
| **60** | $\bar{A}$ B $\bar{C}$ |
| **61** | $\bar{A}$ $\bar{B}$ C |
| **62** | $\bar{A}$ $\bar{B}$ $\bar{C}$ |

Each of the gates above also receives an input $\overline{CP3}$. This input is obtained by applying CP3 to inverter 63.

In the operation of the encoder portion shown, only one of the eight "none" gates can be made conductive at a time. For example, in the case in which the inputs to flip-flops 50, 52 and 54 are all "one" thereby setting all flip-flops, then $A=0$, $B=0$ and $C=0$. Under these conditions, gate 55 and only gate 55 conducts when CP3 is made "one." Therefore, conductor $\alpha_1$ of the eight wire bus $\alpha$ carries a "one" and the remaining seven conductors, namely $\alpha_2$–$\alpha_8$ all carry a "zero."

*Recognition gates and registers driven by recognition gates*

FIG. 5 indicates that there are 1024 recognition gates which are driven by the encoders 40 and 42. FIG. 6 illustrates one recognition gate 64 of the 512 read-in recognition gates and one recognition gate 66 of the 512 read-out recognition gates. The remaining recognition gates are similar to the ones illustrated except that they receive different combinations of inputs: $\alpha$, $\beta$, $\gamma$ in the case of the read-in gates, and *a, b, c* in the case of the read-out gates.

The read-in recognition gate 64 is an "and" gate. It is illustrated as receiving inputs $\alpha_1$, $\beta_1$ and $\gamma_3$. $\alpha_1$ is an input from the eight wire $\alpha$ bus. $\beta_1$ refers to an input from the first conductor of the eight wire $\beta$ bus. $\gamma_3$ refers to an input from the third conductor of the eight wire $\gamma$ bus. When $\alpha_1$, $\beta_1$ and $\gamma_3$ are all "one," "and" gate 64 conducts and a "one" is applied to the read-in register control 65. This circuit, which is shown in more detail in FIG. 7, produces a first output signal $RE=1$ followed by a second output signal $RI=1$.

The read-out recognition gate is also shown as an "and" gate and is legended 66. It receives inputs $a_1$, $b_5$, $c_6$. Thus, when the first wire of the *a* bus, the fifth wire of the *b* bus and the sixth wire of the *c* bus carry a "one," "and" gate 66 conducts and applies a "one" output to read-out register control 67. The purpose of this control is to produce an output signal $RO=0$ when it receives a "one" input. This circuit is shown in more detail in FIG. 8.

In the example chosen for illustration, it is desired to transfer a word stored in one register to a second register. The register which is to receive the word is shown schematically at 70 in FIG. 6. In the system under discussion, a data word is assumed to contain 28 bits. Accordingly, the register 70 includes 28 flip-flops. Only three of these flip-flops, namely the $2^0$, $2^{26}$ and $2^{27}$ flip-flops are shown. As in previously illustrated flip-flops, the designations $2^0$ and so on refer to the rank of the binary bit stored by the flip-flop. The input gates to the register are "and" gates. Again, there are 28 "and" gates required, however, only three of them, namely 71, 72 and 73 are shown.

In operation, when "and" gate 64 is rendered conductive, the read-in register control first applies a signal $RE=1$ to the reset terminals of all flip-flops. This signal resets the register. Shortly thereafter, the read-in register control 65 applies a signal $RI=1$ to all of the "and" gates thereby enabling the "and" gates. The data word thereupon flows from the data bus through the "and" gates to the flip-flops making up the register.

The register from which the data word just discussed is taken is shown at 75. Like the register 70, it includes 28 flip-flops but only three of them are illustrated. The output gates of this register consist of "none" gates. Again, 28 gates are required, one for each flip-flop, however, only three of the "none" gates 76, 77 and 78 are illustrated.

In operation, when it is desired to read-out the register 75, recognition gate 76 is rendered conductive, whereupon the read-out register control 67 applies a signal $RO=0$ to the "none" gates enabling the "none" gates. Thereupon the word stored in the register flows through the "none" gates to the 28 wire data bus. From the data bus, the word flows into the selected receiving register 70 in the manner already discussed.

In the operation discussed above, the read-in recognition gate 64 is enabled concurrently or substantially concurrently with the read-out "and" gate 66. This concurrent enabling is accomplished with the aid of the independent bit pattern register sections **26*a* and 26*b*, encoders 40 and 42**, and buses $\alpha$, $\beta$, $\gamma$ and *a, b, c*, respectively.

The data transmission from register 75 to register 70 can be terminated in a synchronous manner in the event that the data processing system which incorporates this invention is synchronous, or it can be terminated in an asynchronous manner. The latter type of data transmission is discussed in more detail in the copending Gloates et al. application referred to above. There it is explained that the receiving register 70 feeds back the word it receives through the output gates of the register 80, 81 and 82 to a feedback data bus. The gates 80, 81 and 82 may be enabled by a command $RO_{70}$ applied to terminal 83 from another recognition gate (not shown). Alternatively, $RO_{70}$ may be derived by inverting the signal RI from read-in register control 65. The word fed back by register 70 to the feedback bus is compared with the word received by the register in a comparator (see the above-mentioned copending application) and, when the words are equal, a signal is produced which terminates CP3 and starts CP4.

For the sake of drawing completeness, three of the input gates for the read-out register 75 are illustrated. These are connected to the data bus and, upon receipt of a read-in signal from another recognition gate (not shown), permit the register 75 to read-in a data word.

*Read-in and read-out register controls*

Figure 7:
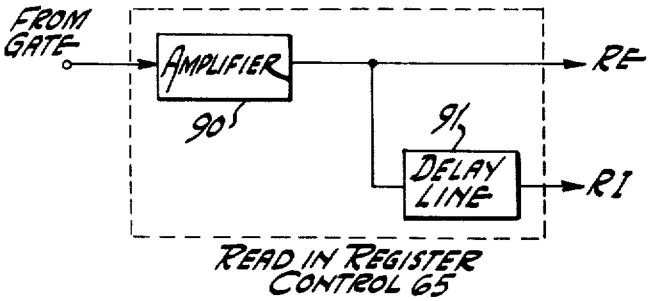
FIGS. 7 and 8 are more detailed diagrams of the read-in and read-out register control circuits of FIG. 6.

The read-in register control 65 of FIG. 6 is shown in FIG. 7. It includes an amplifier 90 for producing the signal $RE=1$ for resetting the register. The amplified signal is delayed by delay line 91 which produces a signal $RI=1$ for enabling the input "and" gates to the register.

Figure 8:
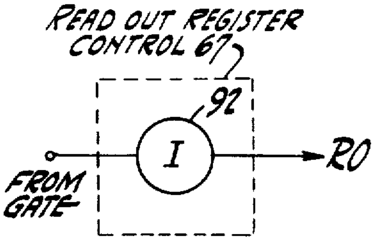

The read-out register control shown in FIG. 8 merely consists of an inverter 92. Its function is to amplify and invert the signal it receives. The one input from the recognition gate is applied through the inverter to produce a read-out signal $RO=0$. On the other hand, when the output signal of "and" gate 66 is "zero," the inverter 92 produces an output $RO=1$ for disabling the output "none" gates of the register.

*Other embodiments and uses for the invention*

The invention has been illustrated above in terms of encoders which produce a 3 in 24 code. However, it should be appreciated that the invention is not restricted to this particular code. In general, any combination of 1 in 4, 1 in 8 and 1 in 16 codes is suitable. It is also possible to use other codes such as 1 in 32 and so on, however, these higher codes are not believed to be as practical in view of the cost of the large encoders which would be required. For example, the 1 in 32 encoder would require 32, five input gates. It is more economical to employ a combination of 1 in 4 and 1 in 8 codes which would require, respectively, four and eight gates.

Figure 9:
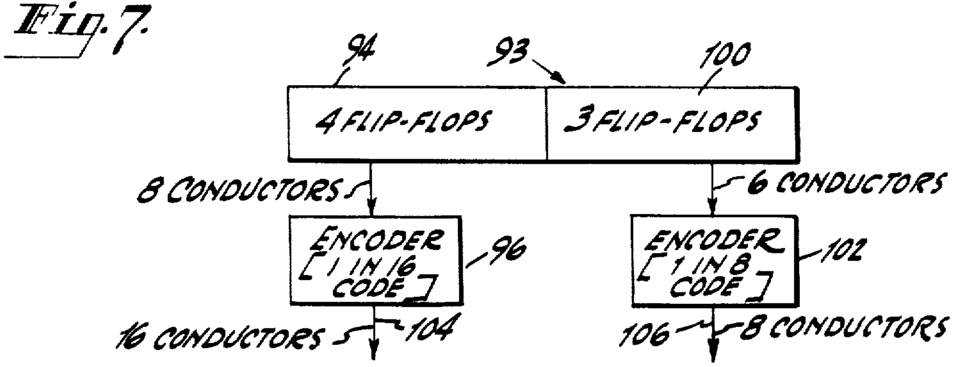
FIG. 9 is a block circuit diagram of a second form of the present invention.

An embodiment of the invention which employs a combination of a 1 in 16 encoder and a 1 in 8 encoder is shown in FIG. 9. A register 93 includes in a first section 94, four flip-flops and in a second section 100, three flip-flops. The first section 94 of the register is connected through an eight conductor bus to encoder 96. Four of the conductors carry bits and four of the conductors carry complements of the bits. The encoder 96 has 16 gates each of which receives four inputs. As in the case of the encoder previously discussed, one of the gates conduct at a time and each of the gates conducts in response to a different input code. The output bus 104 from the encoder 96 has 16 conductors, one of which carries a "one" and the others of which carry a "zero."

The second section 100 of the register is connected through a six conductor bus to encoder 102. The encoder is a 1 in 8 encoder just like the one already described in connection with FIG. 6. It converts the binary code applied by the six conductors to a 1 in 8 code. The output of the encoder is an eight encoder bus 106. One of the conductors carries a "one" and all others "zero."

The arrangement shown in FIG. 9 is employed in a certain computer to select one of 128 different registers. The recognition gates of the registers are distributed in the manner already discussed. However, each recognition gate has only two inputs. One of these inputs is a conductor from bus 104 and the other input is a conductor from bus 106.

The invention has been illustrated in terms of the selection of one particular register to transmit a word and of another register to receive a word. It is to be understood that the arrangement has many other uses. For example, in a particular computer the encoding arrangement described is employed in the following ways.

(1) To transmit arithmetic commands.

(2) To select a central parity checker-generator and comparator to act in different fashions in connection with different computer operations.

(3) To select codes to generate addresses.

(4) To select codes which control the address modifier in the computer.

(5) To trigger different decision making networks in the computer.

What is claimed is:

1. In combination, an $n$ stage register, each said stage storing a binary digit, whereby said register is capable of storing one of $2^n$ different words; an encoder connected to said register for translating the word stored in the register, whatever the value of the word, into $k$ words, each having more than two bits, where one bit of each encoded word is a binary digit of one value and all other bits of each encoded word are binary digits of another value, where $k$ is an integer substantially smaller than $n$ and the total number of bits in the $k$ words produced by the encoder is substantially smaller than $2^n$; $k$ buses connected to said encoder, each having a number of conductors sufficient to carry the bits of a different one of the encoded words; and a plurality of decoder gates, each gate connected to a different combination of $k$ wires, one wire per bus, each gate for producing an output in response to a different permutation of the $n$ bits stored in said register.

2. In a data processing machine, an $n$ stage register for storing an $n$ bit word indicative of an operation to be performed; an encoder connected to the register for converting the $n$ bit word, whatever the value of the word, into $k$ words, each having more than two bits, where one bit of each encoded word is a binary digit of one value and the remaining bits of each encoded word are binary digits of the other value; and a plurality of recognition coincidence gates, each gate receiving a $k$ bit input word from said encoder, each said bit from a different one of the $k$ words produced by the encoder, and each gate receiving a different group of the bits produced by the encoder, each gate for producing an output when the $k$ bits it receives are of said one value, where:

$n$ is an integer $k$ is an integer smaller than $n$, and the total number of bits in the $k$ words produced by the encoder is substantially smaller than $2^n$.

3. In a data processing machine, an $n$ stage register for storing an $n$ bit word indicative of an operation to be performed; an encoder connected to the register for converting the $n$ bit word, whatever its value, into $k$ words, each having $m$ bits, where one bit of each encoded word is a binary digit of one value and the remaining $m-1$ bits are binary digits of the other value; and a plurality of recognition coincidence gates, each gate connected to receive a $k$ bit input word from said encoder, each said bit from a different one of the $k$ words produced by the encoder, and each gate receiving a different group of the bits produced by the encoder, each gate for producing an output when the $k$ bits it receives are of said one value, where:

$n$ is an integer $k$ is an integer smaller than $n$ $m$ is an integer greater than 2, and $km$ is substantially smaller than $2^n$.

4. In a data processing machine, an $n$ stage register for storing an $n$ bit word indicative of an operation to be performed; an encoder connected to the register for converting the $n$ bit word, whatever its value, to $k$ words, each having $m$ bits, where one bit of each encoded word has the binary value 1 and the remaining bits the binary value 0; and a plurality of recognition AND gates, each gate receiving a $k$ bit input word from said encoder, each said bit from a different one of the $k$ words produced by the encoder, and each gate receiving a different group of the bits produced by the encoder, where:

$n$ is an integer $k$ is an integer smaller than $n$ $m$ is an integer greater than 2, and $km$ is substantially smaller than $2^n$.

5. In a data processing machine, a register for storing an $n$ bit word indicative of an operation to be performed; a plurality of operations performing stages in the data processing machine each called for by a different one of the $2^n$ permutations which are possible of said $n$ bits; an encoder located relatively close to said register for translating the stored $n$ bit word, whatever its value, into $k$ words, each having more than 2 bits, where one bit of each encoded word is a binary digit of one value and the remaining bits of each encoded word are binary digits of the other value; and a plurality of recognition gates at least some of which are relatively far from the encoder and, each located relatively close to an operations performing stage, each gate receiving a different $k$ bit input word for producing a command signal for its operations performing stage when its $k$ bits are all of said given value, each bit of each $k$ bit word applied to a recognition gate being taken from a different one of the $k$ words produced by the encoder, where:

$n$ is an integer $k$ is an integer smaller than $n$ $m$ is an integer greater than 2, and $km$ is substantially smaller than $2^n$.

6. In a data processing machine: a register for storing an $n$ bit word indicative of an operation to be performed; a plurality of operations performing stages in the data processing machine, each called for by a different one of the $2^n$ permutations which are possible of said $n$ bits; an encoder located relatively close to said register for translating the stored $n$ bit word, whatever its value, into $k$ words, each having $m$ bits, where one bit of each encoded word is a binary digit of one value and the remaining $m-1$ bits are binary digits of the other value; and a plurality of recognition gates at least some of which are relatively far from the encoder and, each located relatively close to an operations performing stage, each gate receiving a different *k* bit input word for producing a command signal for its operations performing stage when its *k* bits are all of said given value, each bit of each *k* bit word applied to a recognition gate being taken from a different one of the *k* words produced by the encoder, where:

$n$ is an integer
$k$ is an integer smaller than $n$
$m$ is an integer greater than 2, and
$km$ is substantially smaller than $2^n$.

References Cited by the Examiner

UNITED STATES PATENTS

| | | | |
|---|---|---|---|
| 2,854,653 | 9/1958 | Lubkin | 340—146.1 |
| 2,981,470 | 4/1961 | Richards et al. | 235—159 |
| 3,080,548 | 3/1963 | Hagen et al. | 340—172.5 |

ROBERT C. BAILEY, *Primary Examiner.*

MALCOLM A. MORRISON, *Examiner.*

B. REIN, W. M. BECKER, *Assistant Examiners.*